UNITED STATES PATENT OFFICE.

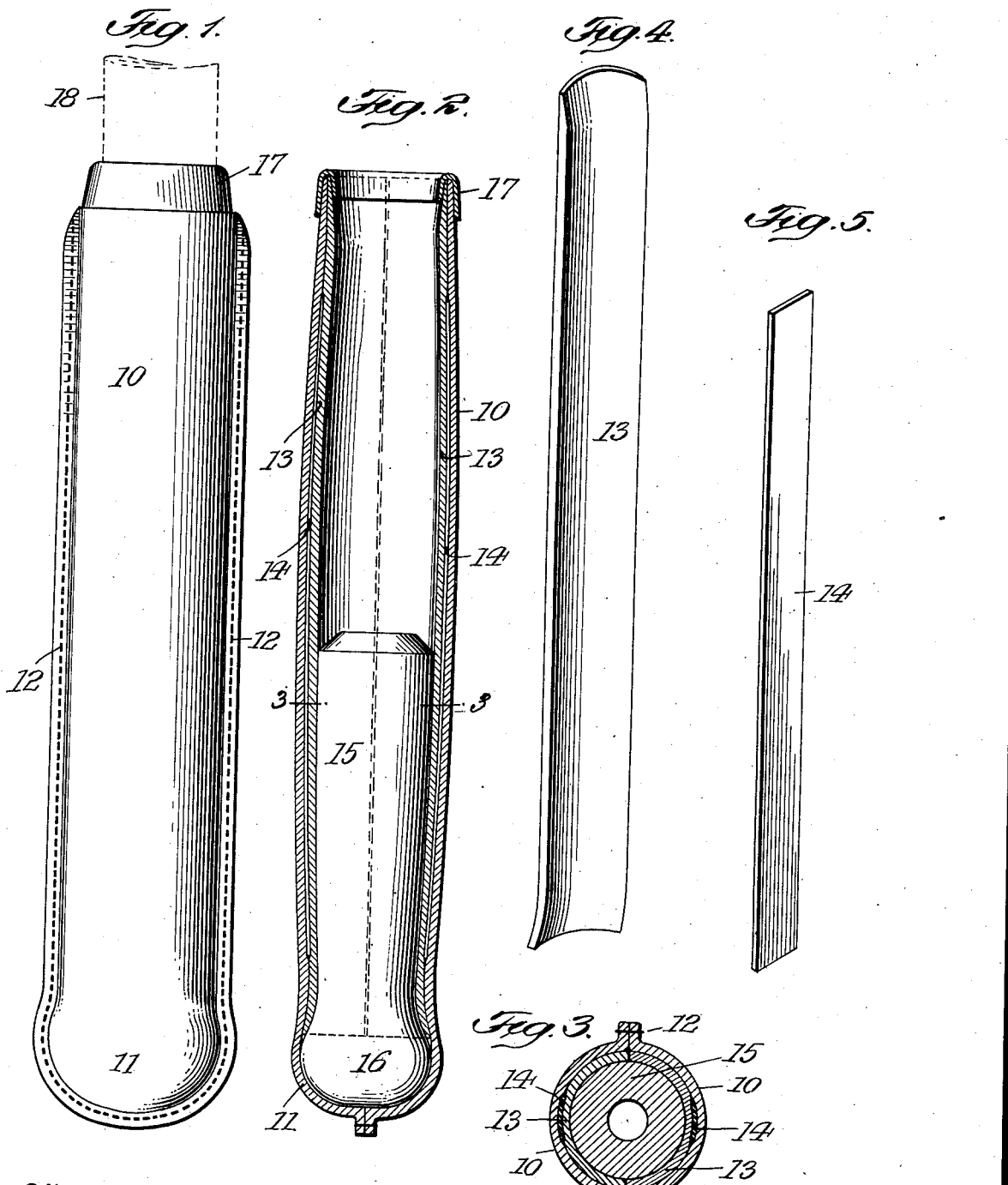

HENRY MESINGER, OF NEW YORK, N. Y.

GRIP FOR MOTOR-CYCLES.

1,100,085.  Specification of Letters Patent.  Patented June 16, 1914.

Application filed November 20, 1913. Serial No. 802,036.

*To all whom it may concern:*

Be it known that I, HENRY MESINGER, a citizen of the United States, residing at New York city, borough of Bronx, State of New York, have invented a new and useful Grip for Motor-Cycles, of which the following is a specification.

This invention relates to a grip for the handle bars of motor cycles which though somewhat yielding is of superior strength and thus insures a firm control of the wheel by the rider.

In the accompanying drawing: Figure 1 is a side view of a grip embodying my invention; Fig. 2 a longitudinal section thereof; Fig. 3 a cross section on line 3—3, Fig. 2; Fig. 4 a detail of one of the fillers and Fig. 5 a detail of one of the stays.

The grip comprises essentially a tubular casing 10 which is made of sole leather and is closed at its outer end but open at its inner end. The casing is composed of two semi-tubular sections, having semi-globular ends 11, and joined to each other by a continuous longitudinal seam 12. Within the casing constructed as described, are glued two reinforcing fillers 13, each filler being composed of a curved leather strip (Fig. 4) of a size to fit snugly against one of the casing sections, the two fillers being separated from each other along the lines of the seam 12. Between each casing section and its filler there is interposed a resilient metal stay 14, (Fig. 5) the two stays being arranged midway between the lines of the seam 12 (Fig. 3) so that in this way the device is thoroughly reinforced throughout its circumference.

Into the outer end of the shell, there is fitted a substantially cylindrical core 15, which is preferably made of wood and is provided with a knob 16 that fills the globular end 11 of casing 10, the filler 13, stopping short of such end (Fig. 2). The inner end of the shell, *i. e.* that end which is not occupied by the core, is adapted for the reception of the handle bar 18, the device being here provided with a flanged ferrule 17, that laps over the end of the casing and filler.

It will be seen that my improved grip may be easily assembled, is of great strength, and though somewhat resilient, of such rigidity that it insures a perfect control of the machine by the rider.

I claim:

1. A grip for motor cycles comprising a tubular casing, an inclosed filler, stays between casing and filler, and a core within the outer end of the casing.

2. A grip for motor vehicles comprising a sectional tubular casing having an outer globular end, a pair of inclosed curved fillers, fitted against the casing-sections, metal stays interposed between casing and fillers, and a core located within the outer end of the casing and having a knob that is received by the globular end thereof.

HENRY MESINGER.

Witnesses:
 AUGUST ERB,
 ADRIEN C. BECKERT.

Copies of this patent may be obtained for five cents each, by addressing the "Commissioner of Patents, Washington, D. C."